United States Patent [19]

Ogden et al.

[11] 4,162,128
[45] Jul. 24, 1979

[54] FOAM PRODUCTS

[75] Inventors: Dennis H. Ogden, Wolverhampton; Frank G. Smith, Sutton Coldfield, both of England

[73] Assignee: British Industrial Plastics Limited, Manchester, England

[21] Appl. No.: 840,356

[22] Filed: Oct. 7, 1977

[30] Foreign Application Priority Data

Jul. 11, 1977 [GB] United Kingdom ............... 28899/77

[51] Int. Cl.² ........................... B01F 3/08; B01F 7/18; B01F 15/02
[52] U.S. Cl. ........................... 366/154; 261/DIG. 26; 366/177; 366/270; 366/314; 366/328; 366/604
[58] Field of Search ............... 366/131, 134, 154, 168, 366/172, 177, 178, 265, 270, 279, 290, 314, 316, 328, 331, 604; 252/359 E; 261/DIG. 26; 277/135

[56] References Cited

U.S. PATENT DOCUMENTS

| 735,364 | 8/1903 | Gold | 277/135 X |
| 1,885,416 | 11/1932 | Connelly | 366/604 X |
| 2,706,108 | 4/1955 | Miner | 366/290 |
| 2,860,856 | 11/1958 | Bauer | 252/359 E |
| 3,268,212 | 8/1966 | Ziselberger | 366/178 X |
| 3,330,536 | 7/1967 | Efstathiou | 252/359 E X |
| 3,744,763 | 7/1973 | Schnoring et al. | 366/178 |
| 3,998,433 | 12/1976 | Iwako | 366/178 |

FOREIGN PATENT DOCUMENTS 1313103 4/1973 United Kingdom .

Primary Examiner—Philip R. Coe
Attorney, Agent, or Firm—Cushman, Darby & Cushman

[57] ABSTRACT

Apparatus for manufacturing low density, cured urea/formaldehyde resin foams includes a centrifugal mixing head comprising a casing and an impeller rotatably mounted therein, the casing having an inlet directed generally axially with respect to the axis of rotation of the impeller and an outlet directed generally tangentially relative to said axis.

9 Claims, 3 Drawing Figures

FOAM PRODUCTS

The present invention relates to apparatus for the production of low density self-sustaining foams of cured urea/formaldehyde resin material. Such foams can be used, for example, in the building industry for thermal insulation purposes.

Low density in the present context means a dry density of less than 20 kg/m$^3$ in the absence of any inert filler, corresponding to a resin solids content of less than 20 kg/m$^3$. Such foams are made by forming a wet foam containing an intimate mixture of a resin and a hardener for the resin, both being initially in aqueous solution. The wet foam can be injected, for example, into a cavity wall and allowed to cure/dry in situ.

Conventional apparatus for producing low-density urea/formaldehyde resin foams suffers from a variety of defects which result in optimum processing conditions being difficult to achieve, mainly due to the many variables involved. It is an object of the present invention to provide apparatus in which the effects of at least some of these variables can be minimised.

According to the present invention apparatus for making low density cured urea/formaldehyde resin foams includes a centrifugal mixing head as hereinafter defined. A centrifugal mixing head in this specification means a casing and an impeller rotatably mounted therein, the casing having an inlet directed generally axially with respect to the axis of rotation of the impeller and an outlet directed generally tangentially relative to said axis.

Preferably the impeller is constituted by at least one paddle projecting radially from a central drive shaft. Advantageously, the paddle is perforated to improve the mixing action. Preferably the impeller has two paddles located on opposite sides of the shaft in dynamically balanced relation thereto, although more than two paddles can be used, if desired. The paddles may also take the form of a set of rods or bars extending radially from the central drive shaft.

The paddles preferably extend from a central boss on the drive shaft, the boss having a conical portion directed towards the inlet. The inlet to the casing may be offset with respect to the axis of the drive shaft so as to provide a maximum duration for the mixing action.

The apparatus preferably includes feed means for supplying resin and hardener to the inlet of the centrifugal mixing head; the feed means preferably includes foam generating means operable to foam the resin or the hardener or both prior to supplying them to the inlet. Advantageously, the centrifugal mixing head is located immediately downstream of the foam generating means and where either the resin or the hardener is unfoamed, the apparatus preferably includes a nozzle for supplying the unfoamed component to the inlet. Preferably the nozzle is located in the inlet and is directed towards the impeller.

Whilst it is normally more convenient to foam the hardener solution prior to mixing in the resin, the apparatus may also be used for the converse route, wherein a foam of resin solution is mixed with an unfoamed hardener solution. For practical purposes, however, it is normally easier to foam the hardener solution—which usually contains a surfactant—than the resin solution which is viscous, especially when relatively undiluted. The resin solution normally also contains a surfactant, but because it is viscous, considerable difficulty may be experienced in mixing it with the foamed hardener solution to obtain a homogeneous wet foam. In conventional foam making apparatus it is necessary to inject the resin solution into the hardener foam by means of an atomising jet and it is this that has hitherto effectively limited the surfactant content of the hardener foam. Too much surfactant in the hardener used in conventional apparatus results in a fine foam which is very stable, but which also tends to restrict the rate of dispersion of atomised resin and give a badly mixed product.

This particular problem is more acute in hot weather but attempts to remedy it by reducing hardener surfactant content can result in coarse-celled foams of inadequate stability.

By using the centrifugal mixing head of the present invention the above-mentioned problems can be to a large extent overcome, since the mixing operation is positive. It is no longer necessary to atomise the resin, so the surfactant content of the hardener foam is not critical and it can be increased beyond conventional levels to give fine, stable homogeneous foams, which allow formulations having a relatively long gel time to be used, without encountering the bad mixing problems frequently experienced when using conventional apparatus.

In our co-pending Application Ser. No. 841,587 filed Oct. 11, 1977, the hardener foam is produced by passing the hardener solution through a foam generating column in such a way as to produce an extremely fine foam. However, this feature is particularly appropriate to the manufacture of the specific low shrinkage foams of that Application, whereas the centrifugal mixing head of this Application is equally applicable to production of conventional foams.

As mentioned above, the apparatus of the present invention can also be used to mix a resin foam with a hardener foam. This particular method of producing urea/formaldehyde resin foams by mixing the resin and hardener as two foams is the subject of our U.K. Pat. No. 1,313,103.

In order that the apparatus of the invention be better understood a preferred embodiment of it will now be described by way of example with reference to the accompanying diagrammatic drawing in which:

DETAILED DESCRIPTION OF THE DRAWINGS

Figure 1:
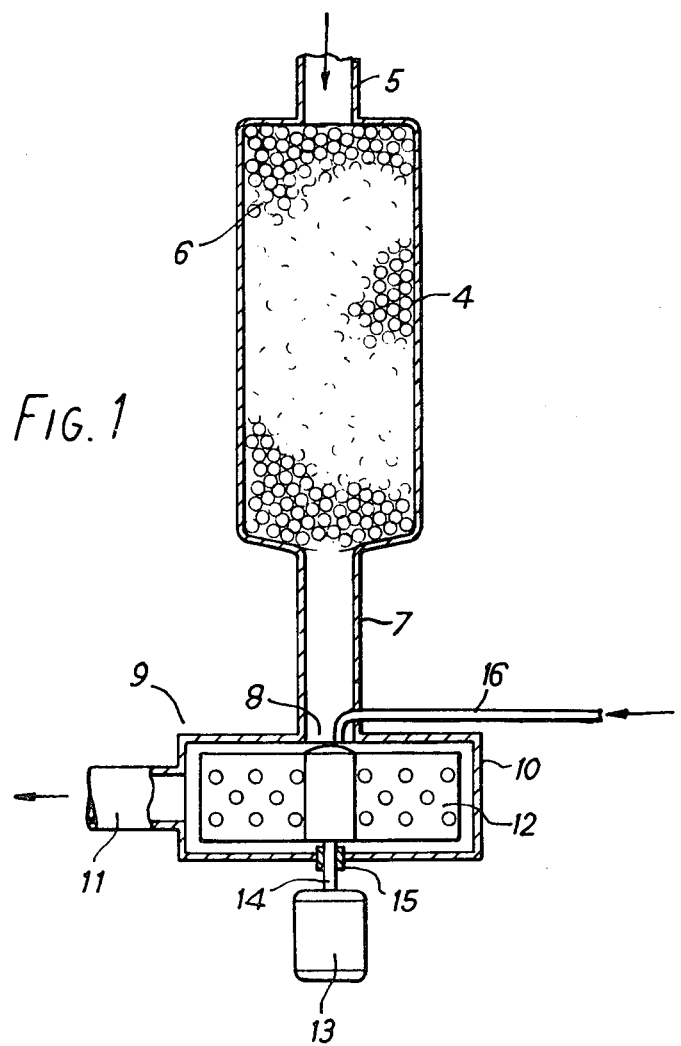
FIG. 1 is a schematic cross-sectional side view through a foam generating apparatus, including a centrifugal mixing head, in accordance with the invention.

In FIG. 1, a foam generating column 4 has a feed pipe 5 to which hardener solution and compressed air are supplied. The column is packed with glass beads 6 and discharges into a coupling pipe 7 which connects it to the inlet 8 of a centrifugal mixing head, generally designated 9, and which has an outlet pipe 11. A resin feed pipe 16 is also provided at the inlet of the mixing head. Referring to all three figures, the mixing head 9 comprises a cylindrical (in plan) casing 10 containing an impeller 12 rotatably mounted in a bearing assembly 15 and driven by an air motor 13 through a shaft 14. The casing is divisible (not shown) along a line parallel to line 3—3 to facilitate cleaning and/or servicing. The impeller has four blades 17, each set in a central boss 18. The blades are perforated to improve the mixing action and the assembly is dynamically balanced about the shaft 14.

In the example described later, the blades were each about 30 mm long, 20 mm deep and had 5 mm holes drilled in them. The inlet 8 is essentially directed onto the conical head of the boss 18, since this has been observed to enhance the mixing efficiency.

Figure 2:
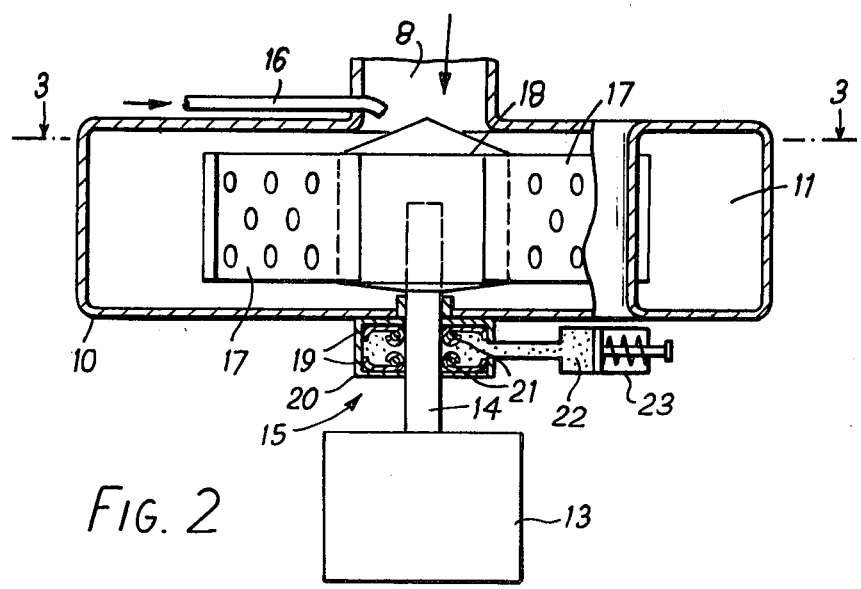
FIG. 2 is a cross sectional side view through the mixing head of FIG. 1.

Referring now to FIG. 2, the drive shaft 14 passing through the base of the mixing head is of course a potential source of leakage and in view of the corrosive nature of the acid hardeners normally used, a simple sleeve bearing is not satisfactory. Accordingly, the bearing assembly includes pair of garter seals 19 in a housing 20. Spring rings 21 urge the seals into contact with the shaft 14. The garter seals are disposed in back-to-back relation and the housing is supplied with grease 22 from a conventional spring loaded pressure lubricator 23, the grease forcing the seals apart and against the housing, whilst at the same time both lubricating the shaft-to-seal contact area and repelling fluid leaking down the shaft. It has been found that apparatus constructed in this way is both reliable and reasonably robust, despite the corrosive nature of the hardener used.

Figure 3:
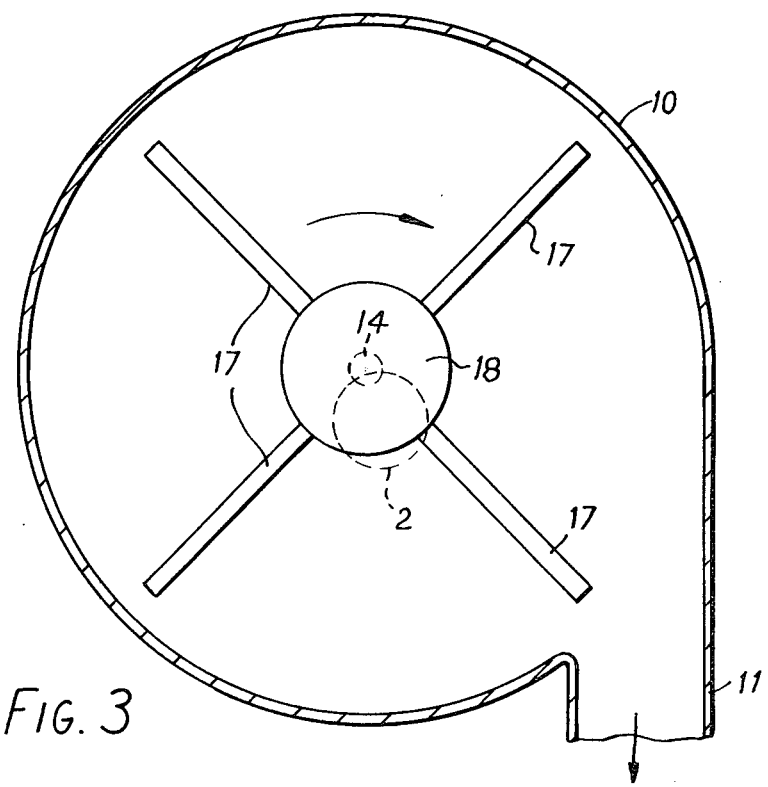
FIG. 3 is a sectional view through the mixing head of FIG. 2 on line 3—3 thereof.

As mentioned earlier, the inlet may be offset with respect to the axis of the shaft 14 and the outlet, as indicated in FIG. 3 by dotted lines 2. This provides for a maximum duration of the mixing action.

EXAMPLE

In a specific operation, an acid hardener solution containing 1.4% by weight of a surfactant was fed to the column 4 at a rate of 2 liters/minute. The feed pipe 5 was also supplied with air at 40 $KN/m^2$ and in the coupling pipe 7, a low density hardener foam resulted. The column was in this case 360 mm long, 45 mm in diameter and packed with 6 mm glass beads.

An aqueous urea/formaldehyde resin solution containing 45 wt.% reactive resin solids was supplied via pipe 16 at a rate of 2½ liters/minute and mixed with the foam in the mixer 9, the impeller being rotated at 900 r.p.m. The resin was in this case "BEETLE" BU700 and the hardener was "BEETLE" FH100, an acidic solution containing an anionic surfactant. "BEETLE" is a Registered Trade Mark of British Industrial Plastics Limited.

The product from the outlet pipe 11 was a homogeneous wet foam which on curing/drying had a final dry density of 14 kg/m.

We claim:

1. In apparatus for producing low density, self-sustaining foams of cured urea/formaldehyde resin material, said apparatus comprising a foam generating column having inlet means for unfoamed liquid and air, outlet means for foam and a foam generating medium interposed between said inlet and outlet means, the improvement comprising a centrifugal mixing head positioned immediately downstream of said outlet means and including a casing, an impeller rotatably mounted therein, an inlet communicating with said outlet means and directed substantially axially with respect to the axis of rotation of the impeller and an outlet directed substantially tangentially relative to said axis, together with a nozzle for supplying unfoamed liquid to the inlet to said mixing head.

2. Apparatus according to claim 1, wherein the centrifugal mixing head includes an impeller constituted by at least one paddle projecting radially from a central drive shaft.

3. Apparatus according to claim 1 wherein the impeller comprises a paddle perforated to improve the mixing action.

4. Apparatus according to claim 1 wherein the impeller has at least two paddles located on opposite sides of the shaft in dynamically balanced relation thereto.

5. Apparatus according to claim 1 wherein the impeller includes a central boss having a conical portion directed towards the inlet.

6. Apparatus according to claim 1 wherein the nozzle is located in the inlet and is directed towards the impeller.

7. Apparatus according to claim 1 wherein the inlet is disposed in the casing eccentrically with respect to the axis of rotation of the impeller so as to ensure a maximum duration for the mixing action.

8. Apparatus according to claim 1 wherein the impeller is driven by means external to the casing through a shaft and including sealing means to minimize fluid loss along said shaft.

9. Apparatus according to claim 8 wherein the sealing means includes a pair of back-to-back sealing rings on the shaft, together with means for supplying a lubricant under pressure between said rings.

* * * * *